US007364395B2

(12) United States Patent
Grimmer et al.

(10) Patent No.: US 7,364,395 B2
(45) Date of Patent: Apr. 29, 2008

(54) SNAP RING DESIGN WITH ANTI-ROTATION STRUCTURES AT OUTER DIAMETER

(75) Inventors: Michael J. Grimmer, Troy, MI (US); Carl M. Romack, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 16 days.

(21) Appl. No.: 11/292,145

(22) Filed: Nov. 21, 2005

(65) Prior Publication Data

US 2007/0116541 A1 May 24, 2007

(51) Int. Cl.
*F16B 21/18* (2006.01)

(52) U.S. Cl. ................................ 411/517; 403/DIG. 7

(58) Field of Classification Search ........ 411/517–519, 411/530; 403/16, DIG. 7
See application file for complete search history.

(56) References Cited

U.S. PATENT DOCUMENTS 1,043,298 A * 11/1912 Clark ........................ 220/236
2,749,162 A * 6/1956 Humphrey .................. 403/20
2,813,732 A * 11/1957 Hird .......................... 403/377
2,835,519 A * 5/1958 Spicacci et al. ............ 403/274
2,883,899 A * 4/1959 Bluth ........................ 411/518
3,326,580 A * 6/1967 Munier et al. ............... 285/27
3,880,483 A * 4/1975 Snyder, Jr. .................. 384/539
4,435,963 A * 3/1984 Shigeru ........................ 63/18
5,758,909 A * 6/1998 Dole et al. .................. 285/305

* cited by examiner

*Primary Examiner*—Flemming Saether

(57) ABSTRACT

This invention relates to a method of eliminating rotation of a snap ring, and more specifically, to an anti-rotation feature on the outer diameter of a gapped snap ring. The invention prevents rotation of the snap ring within the housing in which it is assembled. This is done to prevent the gap, which causes a mechanical imbalance, from changing position within the housing. This enables fixed position balancing mechanisms to be effective in balancing the assembly. A locking feature is provided that is adapted to lock the snap ring in a snap ring groove, preventing the snap ring gap from rotating within the snap ring groove. The locking feature comprises at least one locking feature crest positioned on the outer diameter of the snap ring.

9 Claims, 1 Drawing Sheet

SNAP RING DESIGN WITH ANTI-ROTATION STRUCTURES AT OUTER DIAMETER

TECHNICAL FIELD

This invention relates to a method of resisting rotation of a snap ring, and more specifically, to anti-rotation features on or at the outer diameter of the snap ring.

BACKGROUND OF THE INVENTION

A snap ring is generally employed to retain a part within a housing assembly. The shape of the snap ring is generally circular, with a gap between its ends to allow for insertion of the snap ring into the housing assembly. These features may produce a mechanical imbalance of the assembly as the snap ring rotates with the rotating housing. In many applications, the parts being retained by the snap ring, such as a gear or clutch component, may cause the snap ring to gradually rotate within the housing, changing the position of the gap. The changing position of the gap inside of the housing may change the balance of the assembly.

SUMMARY OF THE INVENTION

This invention relates to a method of resisting rotation of a snap ring, and more specifically, to an anti-rotation feature on or at the outer diameter of the snap ring.

The invention prevents or resists rotation of the snap ring within the housing in which it is assembled. This is done to prevent the gap, which may cause a mechanical imbalance, from changing position within the housing. This enables fixed position balancing structures to be effective in balancing the assembly. The elimination of rotation of the snap ring will also reduce wear of the snap ring and housing used in the assembly.

A method is provided of limiting movement and thereby facilitating balance of a gapped snap ring in a snap ring groove between rotatable parts comprising positioning a locking structure on the snap ring in sufficiently interfereable relationship with the snap ring groove, whereby to resist rotation of the snap ring within the snap ring groove.

In one aspect of the invention, the locking structure is a locking crest outboard of the snap ring. In another aspect of the invention, the locking crest sufficiently interferes by creating high local contact stress between the locking crest and the snap ring groove to resist rotation of the snap ring.

In another aspect of the invention, the locking crest is formed on an outer periphery of the snap ring. In another aspect of the invention, the outer periphery has an outer diameter, and the locking crest extends at least partially over the outer diameter.

An improved snap ring is provided for retaining a part within a housing, the improvement including a locking structure on the snap ring, extendable sufficiently toward the housing to retain the snap ring in a position with respect to the housing, whereby to prevent the snap ring from rotating with respect to the housing.

In another aspect of the invention, the locking structure includes at least one locking crest positioned at the outer diameter of the snap ring. In another aspect of the invention, the locking structure creates high local contact stress between the locking crest and the snap ring groove to resist rotation of the snap ring.

The above features and other features and advantages of the present invention are readily apparent from the following detailed description of the best modes for carrying out the invention when taken in connection with the accompanying drawings.

DESCRIPTION OF THE PREFERRED EMBODIMENTS

A method of eliminating rotation of a snap ring gap is provided. More specifically, an improved snap ring is provided with anti-rotation features or structure at or on the outer diameter of the snap ring.

Figure 1:
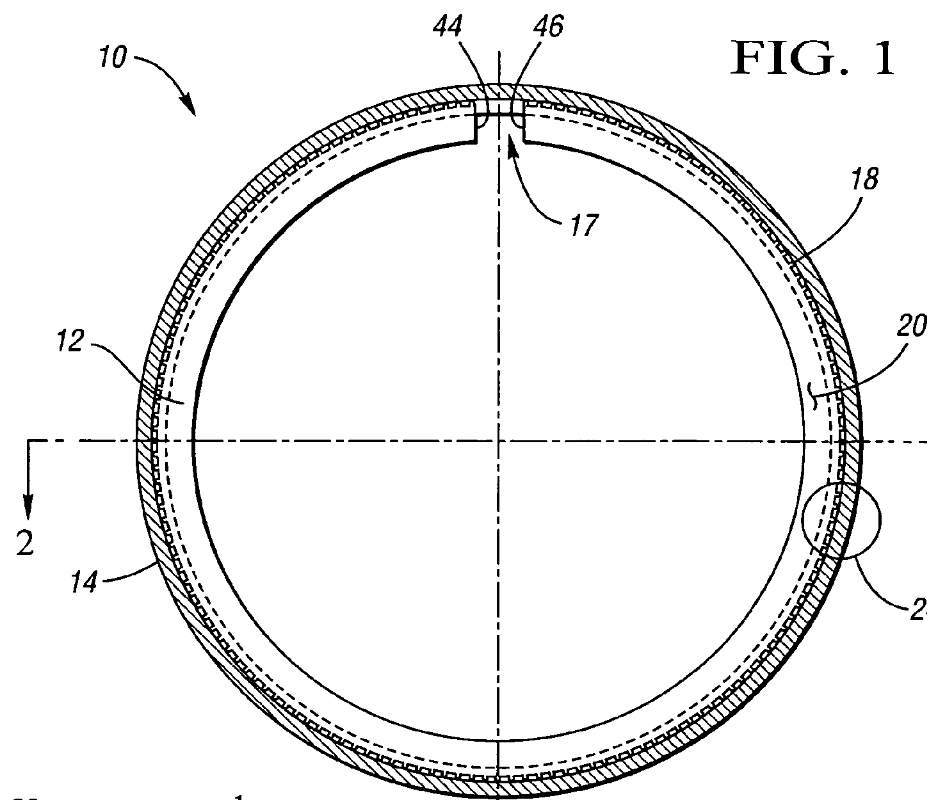
FIG. 1 is a sectional view, partly in elevation, of a housing assembly illustrating an improved snap ring.
Figure 2:
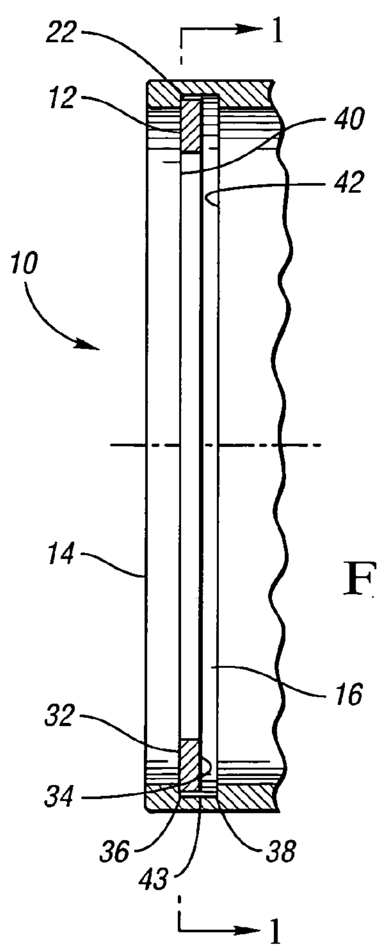
FIG. 2 is a cross-sectional view of the improved snap ring, taken along line 2-2 as shown in FIG. 1.

FIG. 1 is a sectional view, partly in elevation, of a housing assembly 10 illustrating an improved snap ring 12. FIG. 2 is a schematic cross-sectional view of the improved snap ring 12, taken along line 2-2 as shown in FIG. 1. The view illustrated in FIG. 1 is taken along line 1-1 shown in FIG. 2. The housing assembly 10 includes a snap ring 12 employed to retain a part (not shown) inside a housing 14. The retained part may be a gear or another suitable part. The snap ring 12 is inserted into a snap ring groove 16, which is part of the housing 14.

The snap ring 12 has a gap 17, a snap ring outer diameter 18 and a snap ring face 20, as shown in FIG. 1. The snap ring outer diameter 18 has a thickness characterized by an outer edge 22 on both sides of the snap ring face 20. Before installation the snap ring 12 has a larger diameter than the snap ring groove 16 that is part of the housing 14. The difference in diameter of the snap ring 12 causes a force between the snap ring outer diameter 18 and the snap ring groove 16 after being assembled into the housing 14 using conventional snap ring assembly tools and methods. During assembly, the snap ring 12 is compressed or contracted so as to be able to fit into the snap ring groove 16. The snap ring 12 may rotate within the snap ring groove 16 due to loading of the housing 14 or the components that are retained by the snap ring 12.

Figure 3:
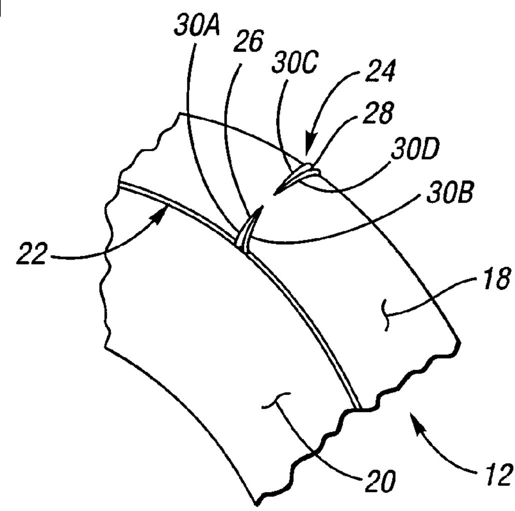
FIG. 3 is a schematic fragmentary view of a locking crest.
Figure 4:
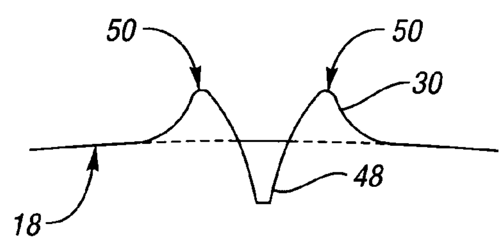
FIG. 4 is a schematic cross-sectional view of a locking feature on an improved snap ring.

The improved snap ring 12 has a locking feature 24, as shown in FIG. 1. The locking feature 24 includes at least one locking structure, such as a first locking structure 26 and a second locking structure 28. The first locking structure 26 and a second locking structure 28 are shown in FIG. 3. Each locking structure may include a plurality of structural locking crests 30. FIG. 4 illustrates the locking crests 30. The first locking structure 26 shown in FIG. 3 has two locking crests 30A and 30B. The second locking structure 28 shown in FIG. 3 has two locking crests 30C and 30D. The locking crests 30 are small and abrasive and lock the snap ring 12 into the snap ring groove 16 and do not allow substantially any rotation of the snap ring 12. The locking feature 24 sufficiently interferes with the snap ring groove 16 by creating high local contact stress between the locking crests 30 and the snap ring groove 16. The high local contact stress increases the friction forces to substantially resist rotation of the snap ring 12.

The locking crests 30 are outboard of the snap ring 12. The locking crests 30 may be formed on the snap ring outer diameter 18. The snap ring outer diameter 18 refers to the outer periphery 18 of the snap ring 12. The front side 32 and rear side 34 of the snap ring 12 are shown in FIG. 2. The locking crests 30 extend sufficiently around to at least partially cover the snap ring outer diameter 18 and the snap ring face 20 on both the front side 32 and rear side 34 of the snap ring 12. The first and second locking structures 26 and 28 are centered on the outer edge 22 and may extend onto the snap ring outer diameter 18 and snap ring face 20.

With the locking crest 30 extending over both the snap ring outer diameter 18 and snap ring face 20, the locking feature 24 can apply a high contact stress to either of the snap ring groove radii 36 and 38 or either the first face 40 or second face 42 of the snap ring groove 16 or the snap ring groove outer diameter 43. The point of stress may depend upon whether the snap ring 12 has a retaining force applied to the front side 32 and rear side 34 of the snap ring face 20 or whether there is compression or contraction of the snap ring 12.

Thus, an apparatus is provided for limiting movement of a gapped snap ring 12 in a snap ring groove 16 between rotatable parts comprising positioning a first locking structure 26 on the snap ring 12 in sufficiently interfereable relationship with the snap ring groove 16, whereby to resist rotation of the snap ring 12 within the snap ring groove 16, thereby facilitating balancing of the assembly.

An improved snap ring 12 is provided for retaining a part within a housing 14, the improvement comprising a first locking structure 26 and/or second locking structure 28, on the snap ring 12, extending sufficiently toward the housing 14 to retain the snap ring 12 in a position with respect to the housing 14, whereby to prevent the snap ring 12 from rotating with respect to the housing 14.

The invention allows for the use of an improved snap ring 12 having opposed ends 44 and 46 contractible for installation of the snap ring 12 and sufficiently expandable and configured to resist rotation of the snap ring 12 after the installation. The configuration of the snap ring 12 interferes with the snap ring groove 16 to resist rotation of the snap ring 12 after the installation.

Formation of Locking Feature

The locking feature 24 may be formed during the manufacture of the snap ring 12 with a straight knurled finish on or at the outer diameter of a forming tool (not shown). The sharp edge of the forming tool will indent the snap ring 12 to form a locking feature valley 48 and cause the material in the locking feature valley 48 to flow up and form the locking crests 30. The height of the locking crests 30, number of locking features 24, number of locking crests 30 in each locking feature 24 and spacing between individual locking crests 30, may be varied depending on the application. For example, the distance between the peak or tip 50 of the locking crest 30 and locking feature valley 48 may be set at 0.3 mm in a typical application. A plurality of locking features 24 will resist movement of the snap ring 12 inside of the housing 14.

While the best modes for carrying out the invention have been described in detail, those familiar with the art to which this invention relates will recognize various alternative designs and embodiments for practicing the invention within the scope of the appended claims.

The invention claimed is:

1. An improved gapped snap ring for retaining a part within a housing having a substantially circular snap ring groove through a locking action, said improvement comprising: a locking structure formed on an outer diameter of said snap ring, such that the locking structure extends sufficiently toward said snap ring groove to lock said snap ring in a fixed position with respect to said housing, whereby to prevent said gap in said snap ring from rotating with respect to said housing; and wherein said locking structure is formed by indenting said outer diameter to form a sufficient valley inward from said outer diameter so as to cause material from the valley to flow out of the valley to form a locking crest outward of said outer diameter as a result of indenting said outer diameter to form said sufficient valley; said valley having a valley wall which intersects with another wall extending from said outer diameter to form a tip on said crest having a sufficient distance between said tip and said valley to create high local contact stress between said tip and a snap ring groove whereby to facilitate such locking action.

2. The improved snap ring of claim 1, including another locking crest formed at said outer diameter of said snap ring and having another tip as a result of said indenting and the flow out of said valley of material to form the first said locking crest and tip.

3. The improved snap ring of claim 2, wherein said locking structure locks into said snap ring groove by creating high local contact stress between the tips of each locking crest and said snap ring groove to lock said snap ring in said fixed position.

4. The improved snap ring of claim 3, wherein said outer diameter of said snap ring has a sufficient thickness to be indented; and wherein said thickness is characterized by an outer edge.

5. The improved snap ring of claim 4, wherein the tip of each locking crest at least partially covers said outer diameter and is formed sufficiently over said outer edge of said snap ring to lock into said snap ring groove.

6. The improved snap ring of claim 5, wherein the tip of each locking crest at least partially extends over a face of said snap ring on one of a front side and a rear side of said snap ring to lock into said snap ring groove.

7. The improved snap ring of claim 6, including another face on the other one of said front side and said rear side of said snap ring for the tip of another locking crest;

wherein said tip of said another locking crest at least partially extends over said another face on said snap ring.

8. The improved snap ring of claim 1, wherein said locking structure is formed by indenting said outer diameter of said snap ring with a sharp edge of a forming tool.

9. The improved snap ring of claim 1, wherein the locking structure is a knurl.

* * * * *